United States Patent [19]

Hooper et al.

[11] Patent Number: 5,800,657
[45] Date of Patent: Sep. 1, 1998

[54] METHOD OF INTERMITTENT LENGTH STABILIZATION

[75] Inventors: Warren W. Hooper, Mentor, Ohio; James F. Keys, West Bloomfield, Mich.; James F. Kaczynski, Westlake, Ohio; Douglas N. Malm, Northville, Mich.

[73] Assignee: The Standard Products Company, Cleveland, Ohio

[21] Appl. No.: 544,674

[22] Filed: Oct. 18, 1995

[51] Int. Cl.⁶ .................................................. B60R 13/04
[52] U.S. Cl. .............................. 156/244.11; 52/716.5; 156/244.12; 156/244.18; 264/176.1; 428/31
[58] Field of Search .................... 156/243, 244.12, 156/244.11, 244.18; 428/31; 264/176.1; 52/716.5

[56] References Cited

U.S. PATENT DOCUMENTS

| | | | |
|---|---|---|---|
| 2,962,813 | 12/1960 | Kreidler | 156/244.12 X |
| 3,230,127 | 1/1966 | Cleereman et al. | 156/243 |
| 4,116,742 | 9/1978 | Firth | 156/244.22 X |
| 4,304,622 | 12/1981 | Krumm | 156/243 X |
| 4,405,547 | 9/1983 | Koch et al. | 264/173.16 |
| 4,464,218 | 8/1984 | Arnold et al. | 156/244.12 |
| 4,566,929 | 1/1986 | Waugh | 156/243 X |
| 4,585,602 | 4/1986 | Capelle | 264/37 |
| 4,876,052 | 10/1989 | Yamada et al. | 264/148 |
| 5,061,335 | 10/1991 | Tamura et al. | 428/31 X |
| 5,096,645 | 3/1992 | Fink | 156/244.12 X |
| 5,098,498 | 3/1992 | Hale et al. | 156/213 |
| 5,149,478 | 9/1992 | Malm | 264/162 |
| 5,171,499 | 12/1992 | Cehelnik et al. | 156/244.18 X |
| 5,221,387 | 6/1993 | Robbins et al. | 156/244.11 X |
| 5,226,998 | 7/1993 | Few | 156/244.11 |
| 5,271,786 | 12/1993 | Gorney et al. | 156/244.13 X |
| 5,273,608 | 12/1993 | Nath | 156/301 |
| 5,387,303 | 2/1995 | Azuma | 156/243 X |
| 5,393,536 | 2/1995 | Brandt et al. | 156/244.12 X |
| 5,409,653 | 4/1995 | Malm | 264/146 |
| 5,409,657 | 4/1995 | Gerwig et al. | 264/290.2 |
| 5,478,516 | 12/1995 | Malm et al. | 264/146 |
| 5,564,249 | 10/1996 | Borys et al. | 428/122 X |

FOREIGN PATENT DOCUMENTS 0647644 12/1950 United Kingdom.
2274617 3/1994 United Kingdom.

*Primary Examiner*—Henry F. Epstein
*Attorney, Agent, or Firm*—Harness, Dickey & Pierce, P.L.C.

[57] ABSTRACT

A method of forming an intermittent stabilized length of a coextruded trim strip product. The method includes coextruding two strips of a thermoplastic material around intermittent sections of a stabilizing insert by a split extrusion die and forming rolls. A cutter cuts the trim strip product between the intermittent stabilizing sections so as to define trim strip products having ends without stabilizing inserts.

20 Claims, 1 Drawing Sheet

METHOD OF INTERMITTENT LENGTH STABILIZATION

BACKGROUND OF THE INVENTION

1. Field of the Invention

This invention relates generally to a method of stabilizing the length of an extruded strip product and, more particularly, to a method of intermittently stabilizing the length of an extruded strip product that is later cut into separate pieces by inserting intermittent lengths of length stabilizing members within the strip product where the stabilizing members have a length that is less than the length of the molding members after being cut from the extruded strip product.

2. Discussion of the Related Art

Decorative and protective trim strips formed from thermoplastic materials that protect vehicle doors and provide an aesthetically pleasing appearance are common in the automotive industry. Trim strips of this type can be formed by both injection molding processes and extrusion processes. Both of these processes have certain disadvantages which make them less ideal for high volume, high speed production of trim strip products.

Use of an extrusion process is generally limited to forming products that have uniform cross-sections throughout their length. Also, it is difficult to handle a hot extruded product, and move it through a cooling bath, without deforming the product, and rendering it unsuitable for subsequent use.

One problem that exists for extruded trim strip products has to do with the shrinking of the product that occurs after an extruded trim strip product has been cut to a desirable length from a continuous extrusion, and then subsequently cooled. The cooling of the extruded trim strip has resulted in a certain amount of shrinkage of the trim strip that affects the length of the strip. Typically, this shrinkage is on the order of about 1% of the total length of the strip product. Because the automotive industry demands high tolerances with decorative components such as trim strips, the amount of shrinkage of the strip without additional processing has been generally unacceptable for these purposes.

To alleviate the problem of undesirable shrinkage of cut trim strips, it has heretofore been known to coextrude a thermoplastic trim strip product onto a length stabilizing strip, where the stabilizing strip will limit the shrinkage of the trim strip during cooling. U.S. Pat. No. 5,409,653 issued to Malm Apr. 25, 1995, assigned to the assignee of the instant application and herein incorporated by reference, discloses a method of forming strip products from thermoplastic materials where a thermoplastic strip material is coextruded onto a metal backing layer.

When coextruding metal and thermoplastic material, another problem then originates that has to do with forming the shape and contour of the ends of the extruded trim strip for use. By the nature of an extrusion process, the cross-sectional shape of the trim strip is the same through its entire length. Therefore, certain end forming techniques have been performed on trim strip products to provide desirable shapes to the ends of the strips after the strips are cut from a continuous extrusion. For example, U.S. Pat. No. 5,149,478 issued to Malm Sep. 22, 1992, assigned to the assignee of the instant application, and herein incorporated by reference, discloses a method of forming decorative trim strips from a continuous extrusion. This method entails removing material from end portions of the trim strips, and then securing the trim strips to a semi-rigid length of plastic such that the end portions have a tapered appearance.

Although the use of coextruded continuous metal or other stabilizing layers has been effective to eliminate shrinkage of the trim strip product, this has interfered with the ability to shape and form the ends of the trim strip product. Because this layer is more rigid than the thermoplastic layer, known techniques for forming the ends of thermoplastic trim strip product have demonstrated product distortion and/or other processing difficulties, and have been unsuccessful for shaping and forming the ends of trim strip products incorporating the continuous stabilizer.

What is needed is a process that allows for length stabilization of a trim strip product, but does not affect the ability of forming and shaping the ends of the strip product. It is therefore an object of the present invention to provide such a process.

SUMMARY OF THE INVENTION

In accordance with teachings of the present invention, a process of intermittently stabilizing the length of a coextruded product is disclosed. In this process, a series of intermittent sections of a stabilizer insert are directed into a pair of cooperating forming rolls between continuous thermoplastic strips being emitted from a split stream extrusion die. The forming rolls mold the thermoplastic material around the intermittent sections of the stabilizing insert to define a desirable shape of an extruded strip product. The extruded strip product is then cut at places between the intermittent sections of the stabilizing insert so that ends of the cut trim strip products do not include stabilizing inserts which would interfere with end forming process of the cut trim strip.

Additional objects, advantages, and features of the present invention will become apparent from the following description and appended claims, taken in conjunction with the accompanying drawings.

DETAILED DESCRIPTION OF THE PREFERRED EMBODIMENTS

The following description of the preferred embodiments directed to a process of intermittently stabilizing an extruded trim strip product is merely exemplary in nature and is in no way intended to limit the invention or its applications or uses.

Figure 1:
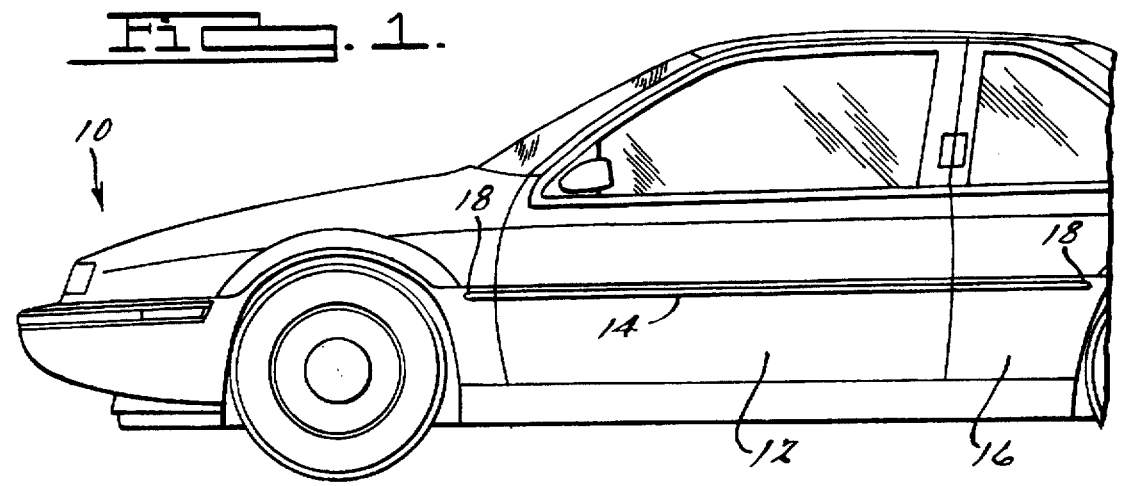
FIG. 1 is a side view of a vehicle including a decorative and protective side trim strip according to an embodiment of the present invention.

FIG. 1 shows a side view of a vehicle 10 including a vehicle door 12. A protective and decorative trim strip 14, formed from a process according to an embodiment of the present invention, is secured to an outer panel of the door 12 and to side panels 16 of the vehicle 10 by appropriate fastening, locating and securing devices (not shown) in a manner that is well understood in the art. Ends 18 of the strip 14 have been tapered by a suitable end forming process, known in the art, to provide an enhanced appearance to the strip 14. The trim strip 14 provides decoration to the vehicle 10, and also protects the paint finish of the vehicle door 12 and the side panels 16 against scratches, scrapes and dings resulting from contact with rigid objects, such as other vehicle doors, around the vehicle 10. Trim strips of the type of the trim strip 14 that include decorative show surfaces coextruded onto thermoplastic base layers, and have formed ends 18, are well known in the art.

Figure 2:
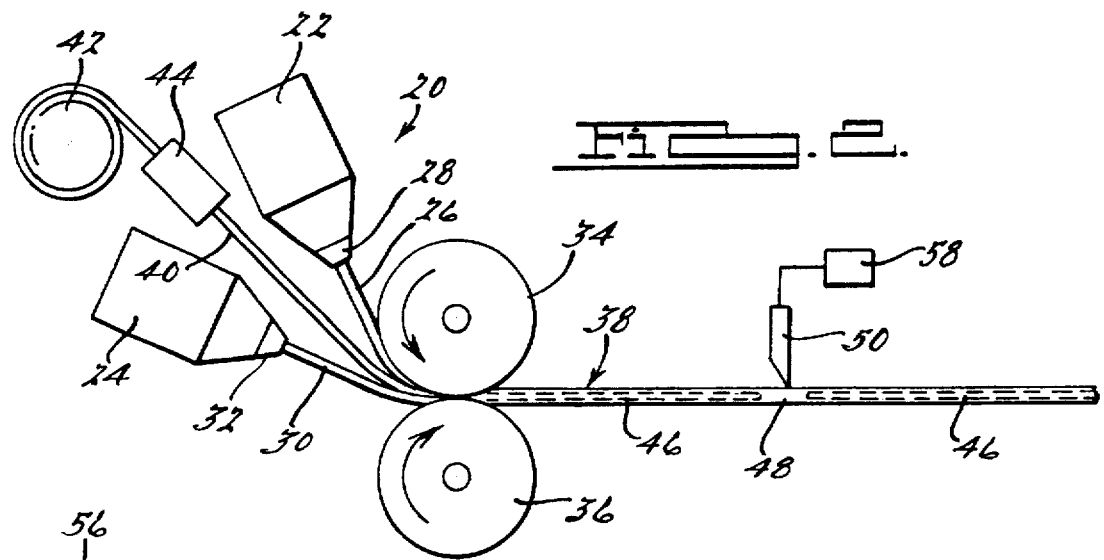
FIG. 2 is an extrusion system showing a process for extruding an intermittent length stabilized product according to an embodiment of the present invention.

FIG. 2 depicts an extrusion system 20 that is applicable to produce the trim strip 14. The extrusion system 20 includes a first extrusion die 22 and a second extrusion die 24. The first extrusion die 22 emits a strip 26 of a suitable thermoplastic material from an orifice 28 of the die 22. Likewise, the extrusion die 24 emits a strip 30 of a suitable thermoplastic material from an orifice 32 of the die 24. The thermoplastic material that makes up the strips 26 and 30 can be any suitable material for the purposes described herein, such as a flexible polyvinylchloride, a thermoplastic olefin, a thermoplastic urethane, as well as other types of plastics. Certain rubbers that are adaptable to the extrusion process as described herein may also be applicable to the invention. The extrusion dies 22 and 24 are intended to represent known types of extrusion dies in the art where a powder, pellet or liquid thermoplastic material is heated, and forced out of the orifices 28 and 32 under a pressure to form the strips 26 and 30 to a desirable heated plastic consistency. The extrusion dies 22 and 24 can be separate extrusion dies, or a split-stream extrusion die, where the dies 22 and 24 would be part of a single extrusion device as is well understood in the art. The use of a compatible and visually similar stabilizing material (discussed below) may be used to provide recyclability and acceptable visual appearance at the end cut. This would enable the cutting of parts through the stabilizing material at increased production rates.

A pair of cooperating forming rolls 34 and 36 receive the thermoplastic strips 26 and 30 to mold the strips 26 and 30 together into a desirable shape. The forming rolls 34 and 36 are driven in a synchronized relationship, and have a cooperating outer surface configuration which defines an opening (not shown) between the rolls 34 and 36 that forms a continuous extrusion 38 to its desired final cross-sectional configuration. In other words, the rolls 34 and 36 mold the heated and pliable strips 26 and 30 into the continuous extrusion 38 to have a desirable cross section. The orifices 28 and 30 can have a shape that generally defines the cross-sectional shape of the strips 26 and 30 to be similar to that of the continuous extrusion 38. The molded thermoplastic strips 26 and 30 come out of the rolls 34 and 36 as the continuous extrusion 38 that is then subsequently cooled by a cooling apparatus (not shown). In one example, the material of the strip 26 provides a show surface and the material of the strip 30 forms a rigid support layer for a product such as the trim strip 14, as is well understood in the art.

In order to prevent the continuous extrusion 38 from shrinking during cooling, a length stabilizing insert 40 is positioned between the plastic strips 26 and 30 prior to the strips 26 and 30 being shaped by the rolls 34 and 36. In one embodiment, the material of the stabilizing insert 40 is aluminum, but other materials, such as steel, may also be applicable for certain embodiments. The insert 40 is unrolled from a roller 42, and enters the opening defined by the rolls 34 and 36 between the strips 26 and 30 so that the extrusion process produces the thermoplastic continuous extrusion 38 to include a stabilizing insert formed within a thermoplastic outer layer. A forming roll or mold (not shown) can be provided to form the insert 40 into a desirable cross-sectional shape prior to the insert 40 being introduced into the rolls 34 and 36.

In accordance with the present invention, a cutter and spacer device 44 cuts the stabilizing insert 40 being unrolled from the roller 42, and intermittently applies sections of the stabilizing insert 40 to the rolls 34 and 36 that are spaced apart a desirable distance. In this manner, the continuous extrusion 38 includes spaced apart stabilizing insert sections 46 where portions 48 of the extrusion 38 do not include metal insert sections 46, as shown. In an alternate embodiment, the device 44 can be a magazine that holds a predetermined number of precut stabilizing inserts, and delivers the inserts one after another in a spaced relationship to the rolls 34 and 36.

Figure 3:
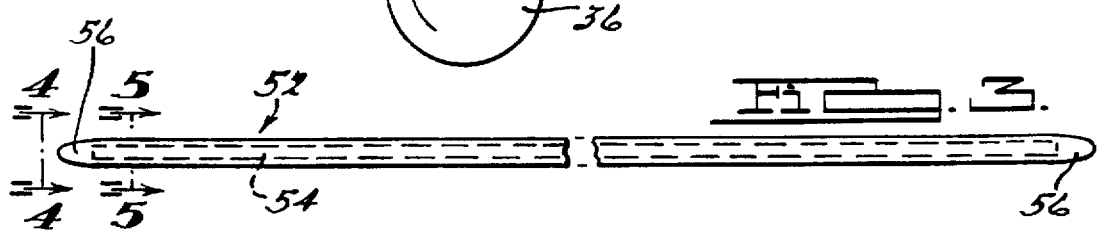
FIG. 3 is a side view of a cut extruded product formed by the process of the invention.

After the continuous extrusion 38 has been at least somewhat cooled, a cutter 50, positioned relative to the continuous extrusion 38, cuts the continuous extrusion 38 into desirable length pieces to form a plurality of extrusion strip sections. FIG. 3 shows a length view of a strip product 52 that has been cut from the continuous extrusion 38, and includes a stabilizing insert 54. The strip product 52 has undergone subsequent end processing to form tapered ends 56. The strip product 52 could be used as the trim strip 14, or other suitable purposes.

As is apparent from viewing the strip product 52, the stabilizing insert 54 does not extend into the tapered ends 56. Therefore, the stabilizing insert 54 does not interfere with the end forming processes to form the tapered ends 56, as discussed above. The system 20 is tailored so that the insert sections 46 are spaced apart enough to form cut strip products where ends of the product have a sufficient length to accommodate different types of end forming techniques known in the art. The cutter 50 is controlled by a suitable control device 58 so that the cutter 50 cuts the portion 48 that does not include stabilizing insert sections 46, as shown. The length of the portion 48 can be different for different desired results.

Figure 4:
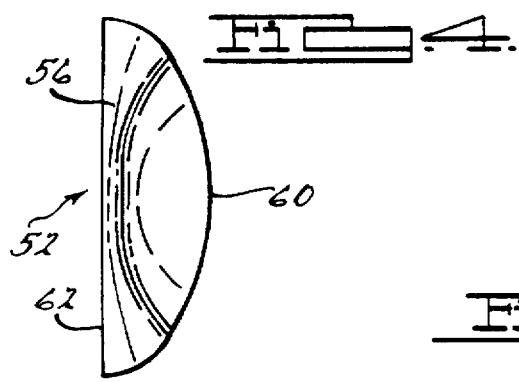
FIG. 4 is an end view of the extruded product of FIG. 3 along line 4—4.
Figure 5:
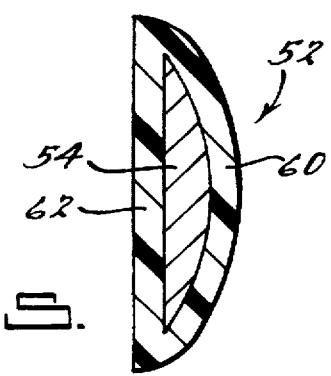
FIG. 5 is a cut-away end view of the extruded product of FIG. 3 along line 5—5.

FIG. 4 shows an end view of the strip product 52 along line 4—4 of FIG. 3 to show the end 56. As is apparent from this view, no metal insert is visible. However, FIG. 5 shows a section view of the strip product 52 along line 5—5 of FIG. 3 to reveal the insert 54 within. As is apparent from these views, the cooperating rolls 34 and 36 form the continuous extrusion 38 to have a rounded top surface 60 and a flat back surface 62. In one example, the rounded surface 60 would be formed from the strip 26, and would be a show surface for the trim strip 14, and the flat back surface 62 would be formed from the strip 30 as the surface to lay flush against the vehicle door 12.

The percent of the length of a strip product formed from the present invention that does not include a stabilizing insert may vary from product to product. In one example, a fifty inch strip product will have a forty-nine inch length of a stabilizing insert within it such that a half inch of the strip product at each end does not include a stabilizing insert. Therefore, the strip product in this example would only shrink one percent of one inch. A half inch at each end of the strip product provides sufficient length to provide end forming without interference of the stabilizing insert. Of course, other end forming techniques may require more or less length not including the metal insert.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of producing an extruded strip product, said method comprising the steps of:
   providing a first strip of a thermoplastic material;
   providing a second strip of a thermoplastic material;
   providing a plurality of separate length stabilizing members;
   forming the first strip of thermoplastic material, the second strip of the thermoplastic material and the stabilizing members into a continuous extrusion where the first and second strips of the thermoplastic material form a thermoplastic layer around the stabilizing members in a manner so that the stabilizing members are spaced apart along a length of the continuous extrusion; and
   cutting the continuous extrusion into sections, said step of cutting including cutting the continuous extrusion between the spaced apart stabilizing members so that strip products are formed having end portions that do not include the stabilizing members.

2. The method according to claim 1 wherein the steps of providing the first and second strips of a thermoplastic material include use of a split die extrusion device.

3. The method according to claim 1 wherein the step of forming the first thermoplastic strip, the second thermoplastic strip and the stabilizing members into the continuous extrusion includes use of forming rolls defining a shaped opening.

4. The method according to claim 1 wherein the stabilizing members are sections of aluminum.

5. The method according to claim 1 wherein the step of providing stabilizing members includes selectively cutting the stabilizing members from a continuous roll and spacing the cut members apart from each other.

6. The method according to claim 1 wherein the step of providing the stabilizing members includes selectively providing precut inserts members stored in a magazine.

7. The method according to claim 1 wherein the strip products are trim strips configured to be secured to an outer surface of a vehicle.

8. The method according to claim 1 wherein the strip product is formed into a strip product having a curved upper show layer and a flat lower base layer.

9. The method according to claim 1 wherein the strip product is formed into a strip product having tapered ends.

10. The method according to claim 1 wherein the step of cutting the continuous extrusion into sections includes use of a control device that selectively applies a cutter to the continuous extrusion between spaced apart stabilizing members.

11. A method of producing an extruded strip product, said method comprising the steps of:
    providing a first strip of an extrudable material;
    providing a plurality of separate length stabilizing members; and
    coextruding the first strip of the extrudable material with the stabilizing members so as to form a continuous extrusion including spaced apart stabilizing members separated along a length of the continuous extrusion.

12. The method according to claim 11 further comprising the step of cutting the continuous extrusion between the stabilizing members so as to form cut strip products having end portions that do not include stabilizing members.

13. The method according to claim 11 further comprising the step of providing a second strip of an extrudable material, wherein the step of coextruding the first strip of the extrudable material with the stabilizing members includes extruding the first strip, the second strip and the stabilizing members so that the continuous extrusion includes spaced apart stabilizing members surrounded by the extrudable material.

14. The method according to claim 13 wherein the steps of providing the first and second strips includes use of a split die extrusion device.

15. The method according to claim 14 wherein the continuous extrusion is formed by cooperating forming rolls.

16. The method according to claim 11 wherein the step of providing a plurality of stabilizing members includes selectively providing pre-cut stabilizing members stored in a magazine.

17. A method of producing a trim strip to be secured to an outer panel of a vehicle, said trim strip having a curved upper show layer and a flat lower base layer, said method comprising the steps of:
    providing a first strip of an extrudable material;
    providing a second strip of an extrudable material;
    providing a plurality of separate length stabilizing members;
    directing the first and second strips of extrudable material into a shaped opening of a pair of forming rolls;
    sequentially directing the plurality of separate length stabilizing members between the first and second strips of the extrudable material prior to the first and second strips entering the forming rolls so that the first and second strips of the extrudable material and the length stabilizing members combined to form a continuous extrusion that includes an extrudable material formed around spaced apart length stabilizing members that are separated along a length of the continuous extrusion; and
    cutting the continuous extrusion into sections along the length of the continuous extrusion between the spaced apart stabilizing members so that strip products are formed having end portions that do not include the stabilizing members.

18. The method according to claim 17 wherein the stabilizing members are sections of aluminum.

19. The method according to claim 17 wherein the step of providing stabilizing members include selectively cutting the stabilizing members from a continuous roll and spacing the cut stabilizing members apart from each other.

20. The method according claim 17 wherein the step of providing the stabilizing members includes selectively providing precut members stored in a magazine.

* * * * *